United States Patent [19]

Yoakum

[11] 3,759,285
[45] Sept. 18, 1973

[54] PRE-CAST BASE AND METHOD FOR MANHOLES AND THE LIKE

[76] Inventor: Ronald E. Yoakum, R.R. 1, Union, Ohio

[22] Filed: Dec. 11, 1972

[21] Appl. No.: 314,025

Related U.S. Application Data

[63] Continuation-in-part of Ser. No. 202,529, Nov. 26, 1971, abandoned, which is a continuation of Ser. No. 7,812, Feb. 2, 1970, abandoned.

[52] U.S. Cl.................. 137/363, 285/110, 285/230, 285/379
[51] Int. Cl. ........................... F16l 5/02, F16j 15/50
[58] Field of Search.................... 277/207 A, DIG. 1; 285/110, 158, 230, 231, 288, 291, 345, 379; 52/19, 20, 21

[56] References Cited
UNITED STATES PATENTS

| | | | |
|---|---|---|---|
| 2,451,070 | 10/1948 | Chamberlain.................. | 285/231 X |
| 2,615,740 | 10/1952 | Nathan .......................... | 277/DIG. 1 |
| 3,046,028 | 7/1962 | Nathan .......................... | 277/DIG. 1 |
| 3,385,012 | 5/1968 | Lovegreen ..................... | 52/21 |
| 3,403,703 | 10/1968 | Reimann........................ | 52/21 X |

FOREIGN PATENTS OR APPLICATIONS

| | | | |
|---|---|---|---|
| 290,612 | 3/1963 | Netherlands........................ | 285/231 |
| 1,244,497 | 7/1967 | Germany ...................... | 277/DIG. 1 |
| 511,528 | 8/1939 | Great Britain ................. | 277/DIG. 1 |
| 1,116,951 | 6/1968 | Great Britain ..................... | 285/110 |

OTHER PUBLICATIONS

Engineering News Record 11-1-1962, Page 12, Library Ta 1 E 61.

*Primary Examiner*—Henry T. Klinksiek
*Attorney*—Irvin V. Gleim et al.

[57] ABSTRACT

Pre-cast base for access pits such as manholes and the like includes resilient rubber-like sealing means and method of positioning same at desired locations. The sealing means is anchored in monolithically cast wall and bottom portions of the base and enables precise positioning of the base at a desired location while maintaining sealed joints at the juncture between the base and inlet and/or outlet pipes, and permits universal independent movement of either said pipes or of the base to maintain the seal and yet accommodate changing job conditions.

8 Claims, 8 Drawing Figures

PATENTED SEP 18 1973

3,759,285

INVENTOR.
RONALD E. YOAKUM 3,759,285

PRE-CAST BASE AND METHOD FOR MANHOLES AND THE LIKE

BACKGROUND

This application is a continuation-in-part of application Ser. No. 202,529, filed Nov. 26, 1971, which in turn was a continuation of application Ser. No. 7,812, filed Feb. 2, 1970, both now abandoned.

The present invention relates to underground piping systems and, more particularly, to improved structure and method for establishing and maintaining sealed joints between underground piping and an access structure such as a manhole and the like.

Liquid collection and/or drainage systems for liquids such as storm or sanitary sewage include systems of pipes and conduits together with control devices, pumping stations, and appurtenances. Such pipes, conduits, and appurtenances are installed underground and are thus required to withstand external pressures such as those caused by soil, water, and any additional loads that may be applied at the surface of the ground. Appurtenances include manholes which are access openings from the ground surface which permit a workman to enter to make examinations or repairs to an underground pipe and/or conduit at locations where access is desired such as selected spaced intervals along the pipe or conduit, or where changes in direction or elevation occur.

The present invention is to be distinguished from structures and practices heretofore employed. For example, as exemplified in U.S. Pat. Nos. 443,992 — Hart, 3,385,012 — Lovegreen, 3,403,703 — Reiman, and in Engineering News-Record publication of Nov. 1, 1962, page 12, prior manhole structures of brick and/or concrete have been erected and/or poured in the field. Additionally, such pre-formed structures with and without knock-out sections have been employed. Whenever any of such structures are employed, after providing a suitable excavation, the manhole structure is positioned and/or erected at its desired location, and a pipeline is placed in position up to and beyond the manhole. Thereafter, the pipe section that extends into the manhole structure is sealed in place with grout, mortar, or other suitable material which is applied while in a fluid or plastic state and forms an effective seal upon setting.

The presence of water or other liquids within the aforesaid excavation from inclement weather conditions or from underground sources of liquid presents difficult problems and increased costs in order to effect an adequate seal between the manhole and the pipeline. In an attempt to avoid such problems, the use of a pre-cast base having a pipe section pre-cast therein and pre-sealed thereto have also been proposed heretofore but such pre-sealed structures lack the flexibility needed to accommodate changes that are frequently dictated by things or conditions encountered in the field and which are not known at the time the installation is in the design or planning stage.

In any event installation practice customarily requires that an area be over-excavated initially in order to facilitate and enable the performance of subsequent installation operations. Thereafter, but prior to the emplacement of the manhole and the pipeline, the excavation is partially back-filled to locate the manhole and the pipeline at desired grade levels. After the base and the pipeline have been installed and a seal effected therebetween, differential settling occurs due to the difference between the respective weights of the manhole and the pipe structures.

Thus, it is desirable that a seal be effected automatically when a pipe is inserted into an opening in the wall of a manhole, and that such seal be maintained upon the occurrence of universal relative movements of either the manhole or the pipeline.

SUMMARY

Accordingly, a principal object of the present invention is to provide means automatically effecting a seal at the junctures between a manhole and its inlet and/or outlet pipe connections when a pipe is inserted therein and for maintaining the effectiveness of said seal during and after the occurrence of universal relative movement of either the manhole structure or the pipe structure.

This is accomplished in accordance with the present invention, by the provision of a pre-formed base and seal structure having a peripheral wall portion defining therein one or more openings extending through the wall portion at desired locations for removably receiving conduit means. Annular elastomeric sealing means is positioned within said opening or openings and is integrally connected to said wall portion for automatically engaging the conduit means and connecting and maintaining the conduit means to said wall portion in sealed and in fluid communication with the interior thereof when said conduit means is removably inserted into said sealing means.

DESCRIPTION

These and other objects and advantages of the present invention will become apparent from the following description taken in connection with the accompanying drawings, in which.

Figure 1:
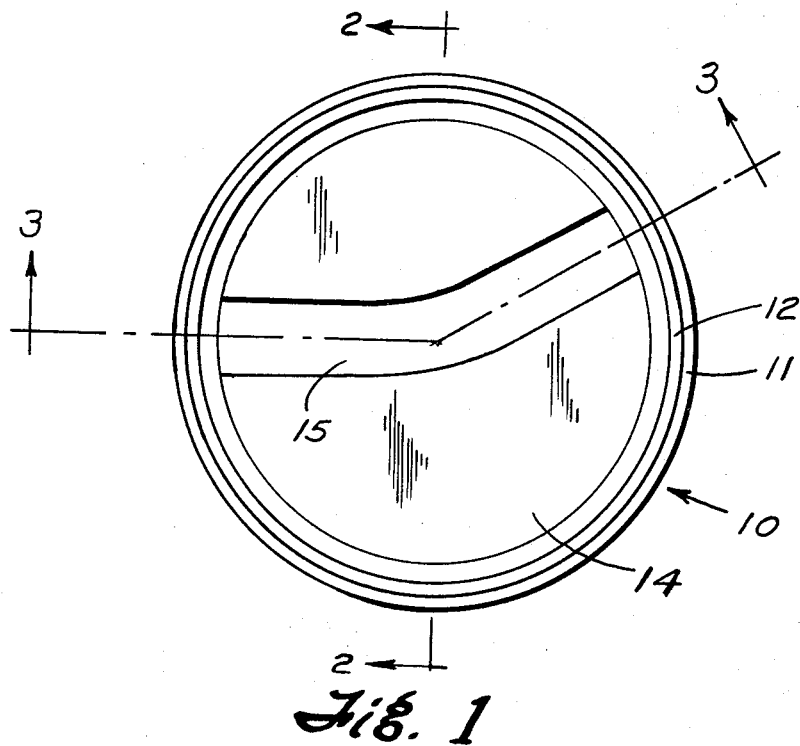
FIG. 1 is a top plan view of a manhole base embodying the present invention.
Figure 2:
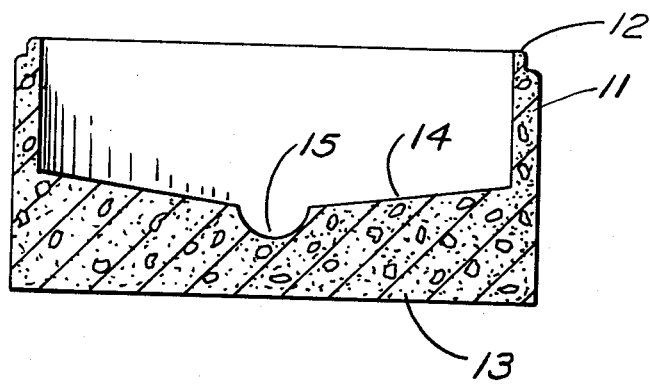
FIG. 2 is a sectional view, looking in the direction of arrows 2—2 of FIG. 1.
Figure 3:
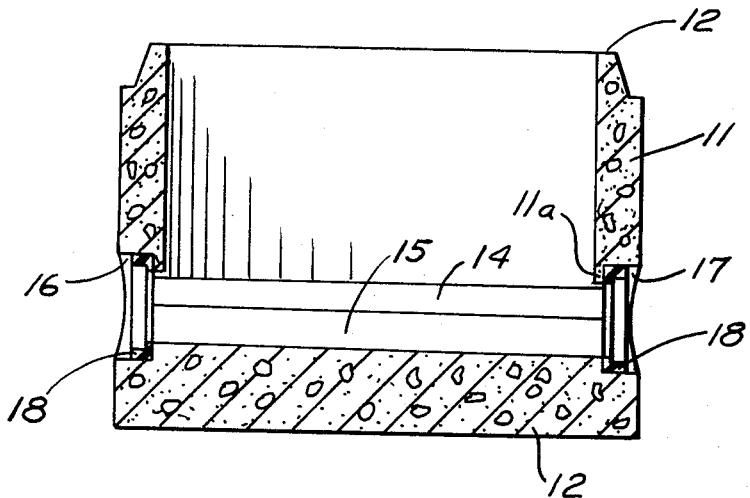
FIG. 3 is a sectional view, looking in the direction of arrows 3—3 of FIG. 1.

Referring to the drawings, a pre-cast manhole base of concrete constructed in accordance with the present invention is indicated generally at 10. Base 10 includes a peripheral wall portion 11 which may include an annular rib 12 upstanding from the upper end thereof to facilitate connection to the riser section of said wall portion of the manhole. The upstanding peripheral wall portion 11 is closed at its lower end by a bottom portion 13. If desired, the upper surface 14 of bottom portion 13 may slope inwardly from the inner surface of peripheral wall portion of 11 and may include a flow channel 15. As shown in FIG. 1, flow channel 15 may be curved if desired but it is to be understood that the flow channel may have any other configuration that may be desired such as, but not necessarily limited to, a straight channel, crossed straight channels, Y-channel, etc.

Adjacent the exterior side wall portion 11, the size of opening is greater than its size adjacent the interior side of the wall portion because of a wall portion 11a that depends from wall portion 11 and provides a seat for one side of the sealing means.

The sealing means 18 is an annular block of resilient material such as rubber or rubber-like material with a central opening 19 therein. Said opening includes an enlarged portion 20 with a shoulder 21 extending between opening 19 and portion 20. Extending outwardly from the annular block are depending portions 18a. The sealing means 18 is a monolithically cast with the wall and bottom portions 11 and of the base and is thereby anchored to wall portion 11 by said depending portions 18a extending thereinto.

The precise size of enlarged portion 20 is not critical. Enlarged portion 20 is large enough so that the end of a pipe can be readily inserted thereinto. And it is small enough that, when so inserted, the material of seal 18 will grippingly engage the exterior of the pipe or conduit and thereby effect a seal at the exterior surface of such pipe or conduit means. It may be desirable to have the size of an enlarged portion 20 somewhat greater than the size of the exterior surface of the pipe or conduit means in which case the enlarged portion 20 will include depending serrations 20a having a central opening therein somewhat small than the exterior surface of the pipe or conduit means. Such serrations are quite flexible and are easily deformed when the pipe is inserted into the enlarged portion of the seal and, due to the resiliency of the material of seal 18, such serrations engage such exterior surface and form an effective seal therewith.

The manhole base is manufactured by pouring concrete between inner and outer form members 21, 22. The opening in the wall of the base is formed by attaching a suitable mandrel 23 to one of the form members prior to the pouring operation.

Mandrel 23 is circular in form and of a size corresponding with the desired diameter or pipe size. An annular skirt 24 depends from the mandrel and provides a cylindrical outer surface 25 and a shoulder 26.

Figure 4:
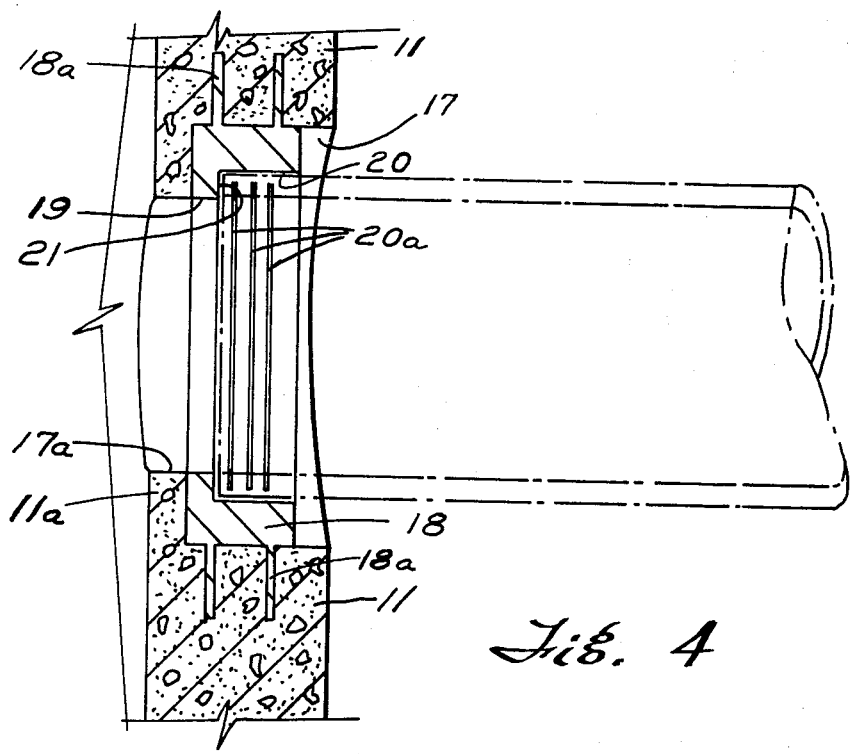
FIG. 4 is an enlarged partial sectional view of the base of FIG. 1 connected to a pipe (shown in phantom lines)
Figure 5:
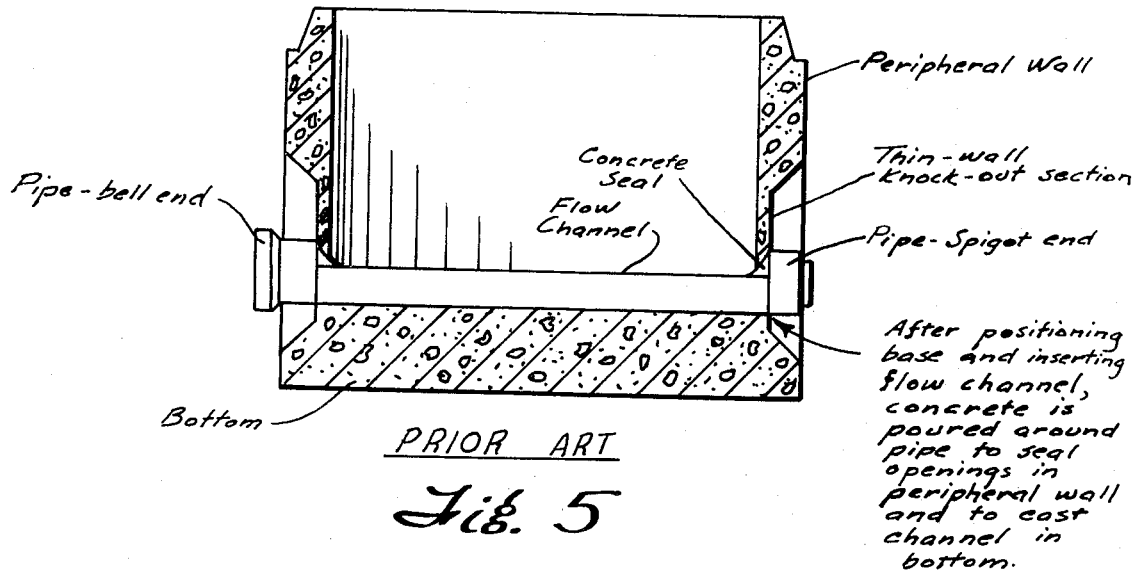
FIGS. 5 and 6 are sectional views illustrative of the prior art.
Figure 6:
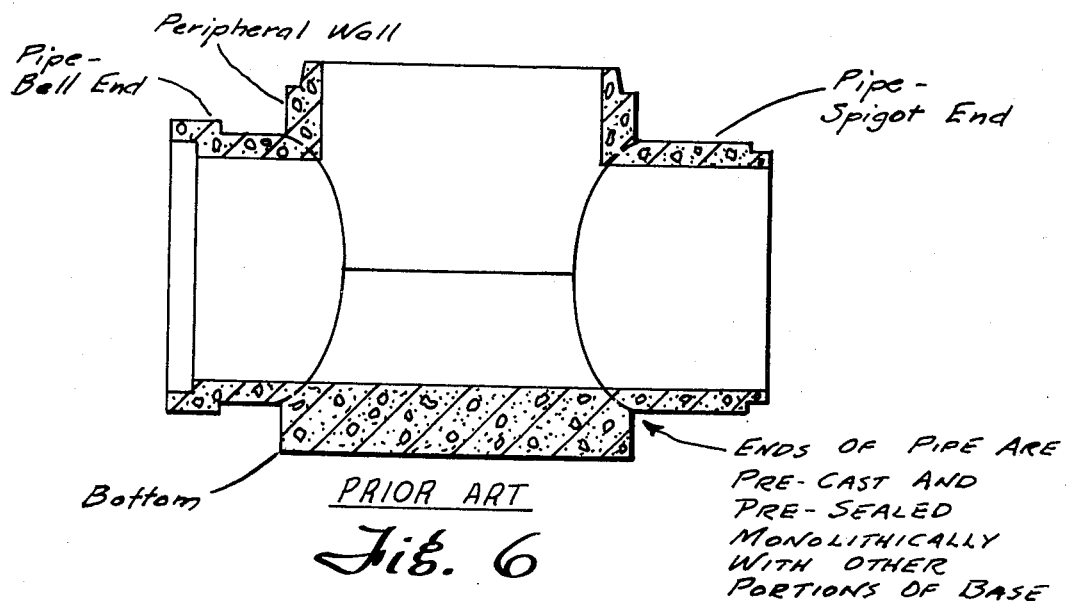
Figure 7:
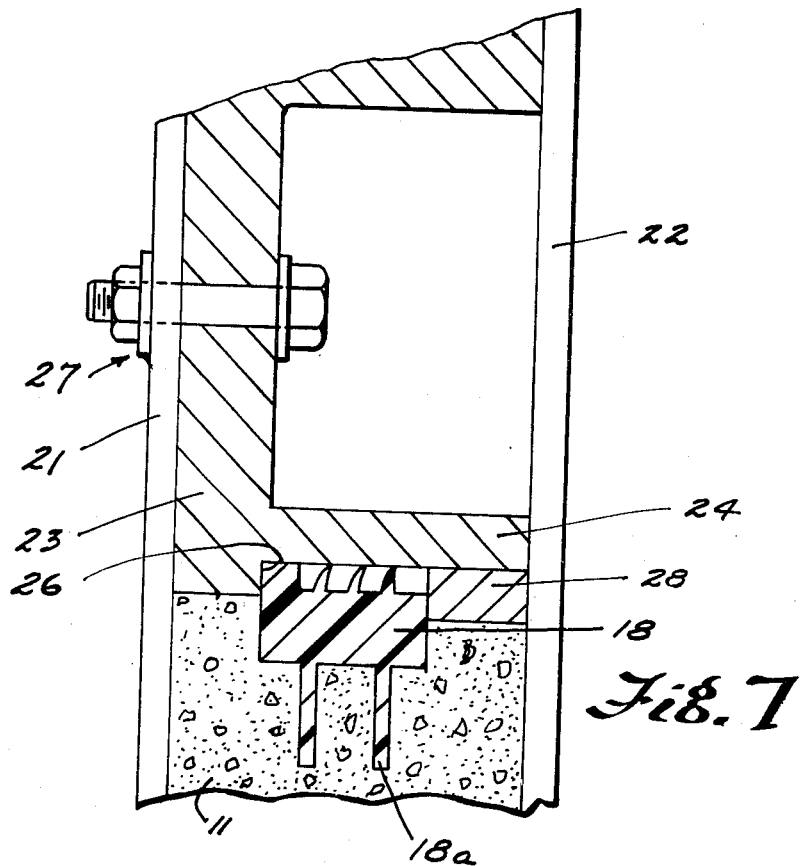
FIGS. 7 and 8 are partial sectional views showing how the seal structure is positioned and secured relative to a manhole base in accordance with the invention.

As shown in FIG. 7, the mandrel is connected to wall 21 by a nut and bolt connection 27 at a location corresponding to the desired location of the pipe opening. The seal 18 is then inserted on surface 25 and in abutting relationship with the seal. Form member 22 is then positioned, as shown in FIG. 7, and the concrete-pouring operation is then effected. After the poured concrete has set and the forms, mandrel, and retainer are removed, the resulting structure is one in which the seal 18 is monolithically cast with wall 11 as shown in FIG. 4.

Figure 8:
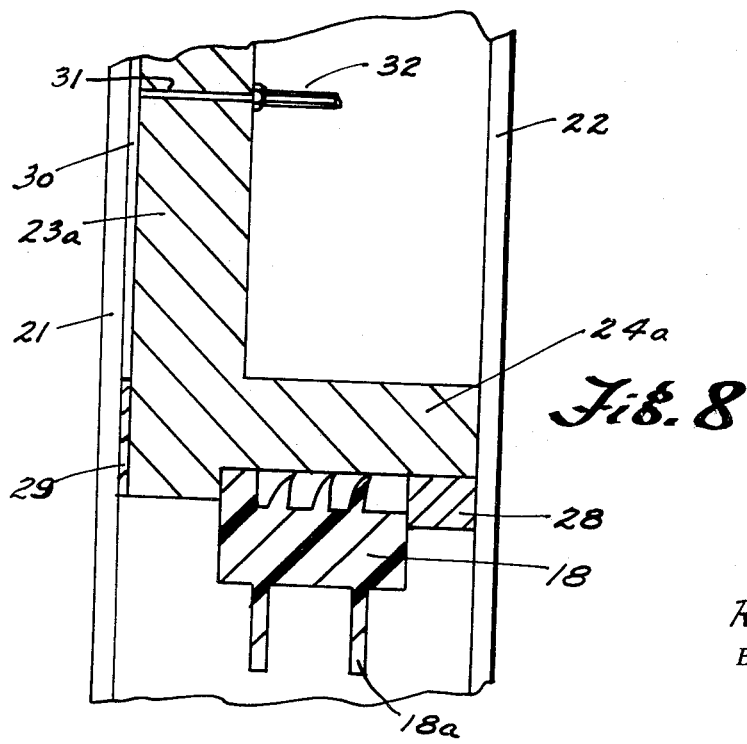

Modified mandrel means, as shown in FIG. 8, is particularly advantageous in the event that it may be desirable to position the pipe opening and the mandrel structure at a plurality of differing locations relative to form members 21, 22. The modified mandrel 23a and its depending skirt 24a are essentially like mandrel 23 and skirt 24, except that the bolt connection 27 is eliminated. Additionally, a resilient annular seal or gasket 29 of elastomeric material is fixed to the left-hand face of mandrel 23a and defines an enclosed space 30 between form member 21 and mandrel 23a when the mandrel is positioned as shown in FIG. 8. A passageway 31 interconnects space 30 and one end of conduit means 32 in fluid-flow relationship. The other end of conduit 32 is adapted to be connected to a known type of vacuum pump, the details of which are not necessary for an understanding of the present invention and accordingly are not shown.

The sealing means 18 and retainer 28 are assembled on mandrel 23a and skirt portion 24a as shown. Thereafter, the assembly can be positioned at any desired location relative to member 21 prior to the concrete-pouring operation. Thus, the mandrel and the forms can be used repeatedly without damage to either of them.

As noted heretofore, a base manhole and the like embodying the present invention can be pre-cast and shipped and/or stored when or until the base is to be installed at a job site. At installation, the contractor positions the pre-cast manhole base at a desired or specified location and cuts a length of pipe or pipes to required length for connection between the manhole base and a piping system. Such length or lengths of pipe are plain and are merely cut to length with no prepared joint. The contractor merely inserts the pipe into the sealing means 18, as shown in FIG. 4, thereby automatically providing a sealed joint which requires no further sealant or finish between the joint and the manhole base and the pipe. Once the pre-cast manhole base has been properly positioned and a length of pipe inserted into seal 18 of any openings that may be provided in the base, the manhole structure is thereafter erected to the desired height in the usual manner employing either pre-cast manhole risers sections or poured walls which are superimposed upon the upper edge of wall portion 11 of the base.

While a particular embodiment of the invention has been illustrated and described, it will be obvious to those skilled in the art that various changes and modifications may be made without departing from the invention and it is intended in the appended claims to cover all such changes and modifications that fall within the true spirit and scope of the invention.

What is claimed is:

1. A pre-formed base for access pits such as manholes and the like for automatically effecting and maintaining a seal between an opening in said base and an underground piping system while permitting independent universal relative movement of either said base or said piping system comprising in combination
    a base portion having a continuous tube-like wall portion upstanding therefrom and defining an opening extending through said wall portion, and
    annular elastomeric sealing means fixed to said wall portion in registry with said opening and simultaneously effecting sealing pressure against said wall portion and against said conduit means when a conduit portion of said piping system is removably inserted into said opening.

2. A base according to claim 1 wherein said wall portion defines at least two such openings and said base portion includes a flow channel extending between said openings.

3. A base according to claim 1 wherein said wall portion is monolithically cast concrete encompassing said sealing means.

4. Structure according to claim 1 wherein said sealing means includes a flexible serration depending therefrom and extending into said central opening therein and sealingly-engaging said conduit means when said conduit means is inserted into said central opening.

5. A seal adapted to be fixed to a tubular wall portion of a monolithically cast concrete pre-formed structure comprising in combination an annular elastomeric body having generally cylindrical inner and outer surfaces encompassing a central opening extending through said body, said body having a depending portion extending outwardly from said outer surface and adapted to be integrally formed with said tubular wall portion, and said body being readily deformable and simultaneously effecting sealing pressure against said wall portion and against a conduit means when said body is fixed to said wall portion and said pipe means is removably inserted into said central opening and permitting independent universal relative movement of either said structure or said conduit means.

6. A seal according to claim 5 wherein said inner surface includes a flexible serration depending from said inner surface.

7. A method of manufacture of a pre-cast portion of an access pit for underground piping systems comprising the steps of assembling an annular elastomeric seal body on a mandrel, fixing said assembly to one of a pair of form members and positioned between said members, pouring concrete between said form members and around said assembly, and removing said form members and said mandrel after said concrete has set.

8. Method according to claim 7 wherein said fixing step includes evacuating an enclosed space between said mandrel and said one form member.

* * * * *